US012065993B2

(12) United States Patent
Draenkow et al.

(10) Patent No.: US 12,065,993 B2
(45) Date of Patent: Aug. 20, 2024

(54) INDIRECT CHARGE AIR COOLER

(71) Applicant: Mahle International GmbH, Stuttgart (DE)

(72) Inventors: Andreas Draenkow, Heimsheim (DE); Nicolas Ferrand, Stuttgart (DE); Jens Richter, Grossbottwar (DE)

(73) Assignee: Mahle International GmbH (DE)

( * ) Notice: Subject to any disclaimer, the term of this patent is extended or adjusted under 35 U.S.C. 154(b) by 385 days.

(21) Appl. No.: 17/232,021

(22) Filed: Apr. 15, 2021

(65) Prior Publication Data
US 2021/0324820 A1 Oct. 21, 2021

(30) Foreign Application Priority Data

Apr. 16, 2020 (DE) .................. 102020204845.2

(51) Int. Cl.
*F02M 31/20* (2006.01)
*F28F 3/08* (2006.01)

(52) U.S. Cl.
CPC .............. *F02M 31/20* (2013.01); *F28F 3/08* (2013.01); *F28F 2245/00* (2013.01)

(58) Field of Classification Search
CPC ...... F28D 7/1692; F02M 31/20; F28F 9/0226; F28F 3/08
USPC ....................................... 123/542
See application file for complete search history.

(56) References Cited

U.S. PATENT DOCUMENTS

| 10,240,872 B2 | 3/2019 | Ferrand et al. | |
| 2004/0065433 A1* | 4/2004 | Meshenky | F02B 29/0462 165/125 |
| 2008/0156472 A1* | 7/2008 | Maucher | B23K 1/0012 165/170 |

(Continued)

FOREIGN PATENT DOCUMENTS

| CN | 103890530 A | 6/2014 |
| DE | 102015220965 A1 | 4/2017 |

(Continued)

OTHER PUBLICATIONS

English abstract for EP-2795221.

(Continued)

*Primary Examiner* — Logan M Kraft
*Assistant Examiner* — Joshua Campbell
(74) *Attorney, Agent, or Firm* — Fishman Stewart PLLC

(57) ABSTRACT

A heat exchanger, e.g., an indirect charge air cooler for an internal combustion engine, is disclosed. The heat exchanger includes a plurality of tubes that provide a first channel system for a first fluid, and a second channel system for a second fluid disposed between the plurality of tubes that is fluidically separated from the first channel system. Two opposite side parts for fluidically bounding the second channel system are provided, between which the plurality of tubes are arranged. At least one frame part is soldered together with a respective outer edge of the two side parts. The outer edge of a side part includes a tab bent over S-shaped as edge reinforcement with a first tab section solder-plated on an outside and a second tab section solder-plated on an inside. The frame part has an S-shaped cross section with a first receptacle that receives the first tab section.

19 Claims, 3 Drawing Sheets

(56) References Cited

U.S. PATENT DOCUMENTS

| | | | | |
|---|---|---|---|---|
| 2008/0223345 | A1* | 9/2008 | Hummel | F02B 29/0462 123/542 |
| 2010/0032149 | A1* | 2/2010 | Roll | F28F 9/182 165/173 |
| 2010/0199955 | A1* | 8/2010 | Smith | F28D 1/05366 123/542 |
| 2012/0210986 | A1* | 8/2012 | Ghiani | F28F 9/001 123/542 |
| 2012/0285423 | A1* | 11/2012 | Nguyen | F28F 9/002 123/542 |
| 2013/0192803 | A1 | 8/2013 | Garret | |
| 2014/0000569 | A1* | 1/2014 | Eilemann | F02B 29/0456 123/542 |
| 2015/0129186 | A1* | 5/2015 | Day | F28F 1/10 165/173 |
| 2017/0115069 | A1* | 4/2017 | Ferrand | F28F 9/0263 |
| 2017/0248371 | A1 | 8/2017 | Garret et al. | |
| 2020/0103184 | A1 | 4/2020 | Ferrand | |

FOREIGN PATENT DOCUMENTS

| | | | | |
|---|---|---|---|---|
| DE | 202010018520 | U1 | 5/2017 | |
| DE | 102017108431 | A1 * | 10/2018 | H01R 13/506 |
| DE | 102017108431 | A1 | 10/2018 | |
| DE | 102018216659 | A1 | 4/2020 | |
| EP | 0735337 | A1 | 10/1996 | |
| EP | 742329 | A1 * | 11/1996 | E05B 9/08 |
| EP | 2795221 | A1 | 10/2014 | |
| FR | 2742534 | A1 | 6/1997 | |
| FR | 2872268 | A1 * | 12/2005 | F28F 9/001 |
| GB | 1387673 | A | 3/1975 | |
| WO | WO-2014001366 | A1 | 1/2014 | |
| WO | WO-2014140119 | A1 | 9/2014 | |

OTHER PUBLICATIONS

Chinese First Office Action dated Dec. 8, 2022 and Chinese Search Report dated Dec. 2, 2022 for Chinese Patent Application No. 2021103933265.
English translation of Chinese Supplementary Search Report for CN2021103933265, dated Mar. 8, 2023.
English abstract for DE-102017108431.
English abstract for FR-2742534.

* cited by examiner

INDIRECT CHARGE AIR COOLER

CROSS-REFERENCE TO RELATED APPLICATION

This application claims priority to German Application No. DE 10 20 204 845.2 filed Apr. 16, 2020, the contents of which are hereby incorporated by reference in its entirety.

TECHNICAL FIELD

The present invention relates to a heat exchanger, in particular an indirect charge air cooler for an internal combustion engine. In addition, the invention relates to a side part of such a heat exchanger and to an internal combustion engine having such a heat exchanger designed as charge air cooler.

BACKGROUND

From WO 2014/001366 A1 a generic heat exchanger with tubes is known, which form a first channel system for a first fluid flowing in a first flow direction. Between these tubes, a second channel system for a second fluid that is fluidically separated from the first channel system is formed. In addition to this, two collectors that are fluidically separated from the second channel system are provided, of which at least one comprises a bottom part and a box part, which bound a collection space of the collector that is fluidically connected to at least one of the tubes. Each bottom part comprises openings in the manner of passages, with which the tubes are connected in such a manner that the associated collection space is fluidically separated from the second channel system. In addition, the tubes are arranged between two opposite side parts for fluidically bounding the second channel system.

From WO 2014/140119 A1 a further heat exchanger, this time formed as plate heat exchanger, is known.

Indirect charge air coolers known to date are usually provided with solder-plated side parts which form a boundary for a channel system. Here, the side parts are solder-plated on one side and comprise a respective outer edge on the longitudinal side, which for reinforcement is bent over in a tab-like. Since the solder plating during the manufacture of the heat exchanger is directed to the inside, but the outer edge nevertheless has to be soldered to corresponding frame parts via the said solder plating, the solder plating faces to the outside on the bent-over tab. In order to be able to ensure a reliable soldering and thus also a tight manufacture of the heat exchanger, the individual components to be soldered to one another are often clamped into a soldering frame which additionally exerts pressure on the components to be soldered to one another. However it is disadvantageous here that with a solder plating facing to the outside a soldering to the associated soldering frame occurs under certain conditions so that following the soldering the heat exchanger has to be elaborately and manually removed from the soldering frame again. In addition, there is also always the risk of crack formation on existing outer edges of side parts known from the prior art because of high pressure swings.

The present invention therefore deals with the problem of stating an improved or at least an alternative embodiment for a heat exchanger of the generic type which in particular overcomes the disadvantages known from the prior art.

According to the invention, this problem is solved through the subject of the independent claim(s). Advantageous embodiments are subject of the dependent claims.

SUMMARY

The present invention is based on the general idea of providing a double-bent S-shaped tab on a longitudinal-side outer edge of a side part of a heat exchanger, wherein in a first tab section a solder plating is arranged on the outside and because of this a soldering for example with a frame part can be easily achieved, while with a second, inverted tab section, the solder plating is arranged on the inside, so that on this second tab section a contact pressure can be exerted during the soldering without having to fear that a soldering frame used for this purpose is soldered for example together with the second tab section and because of this has to be subsequently elaborately and expensively separated again. The reason is that on the second tab section no solder plating is provided on the outside. In addition, the second tab section serves for a further reinforcement of the outer edge of the side part thereby stiffening the same. The heat exchanger according to the invention, which can be designed for example as an indirect charge air cooler for an internal combustion engine, comprises tubes which form a first channel system for a first fluid flowing in a first flow direction. Between the tubes, a second channel system for a second fluid that is fluidically separated from the first channel system is formed, which can be flowed through in a second flow direction, in particular transversely to the first flow direction. The second channel system, between which the tubes are arranged, is fluidically bounded by way of two opposite side parts. The heat exchanger additionally comprises at least one frame part which is soldered to a respective outer edge of the side parts on the longitudinal side. According to the invention, at least one outer edge of a side part now comprises as edge reinforcement the previously described tab bent over S-shaped with a first tab section solder-plated on the outside and a second tab section solder-plated on the inside. Here, the side part can be designed as a simple aluminium plate solder-plated on one side, wherein through the respective folding of the first and second tab section the solder plating is arranged once outside and once inside. The frame part in turn has an S-shaped cross section with a first receptacle, in which the outer edge of at least one side part with its first tab section can be received and in particular pressed and soldered. Through the second tab section according to the invention, not only a significant stiffening of the outer edge can thus be achieved but a solder-free working surface is also additionally provided, via which for example by means of a soldering frame a contact pressure during the soldering can be exerted on the side part. At the same time, the second tab section requires extremely little material and merely one further manufacturing step, so that the advantages that are achievable with the second tab section according to the invention can be technically achieved easily yet cost-effectively.

In an advantageous further development of the solution according to the invention, the first tab section has a width B1 and the second tab section a width B2, wherein B1≥B2 applies. In order to be able to create as large as possible a working surface for example for a soldering frame, which additionally is solder-free and thus excludes the risk of a soldering to the soldering frame, the second tab section is usually chosen at least half as wide as the first tab section.

In an advantageous embodiment of the solution according to the invention, the frame part is connected via a press-fit connection to the first tab section of the respective side part, wherein such a press-fit connection supports for example a subsequent soldered connection and additionally ensures a fixing of the soldered connection to be produced during the soldering process.

In an advantageous further development of the solution according to the invention, a thickness D of the side part amounts to approximately 1.2 mm±0.1 mm. This can be substantially stiffened through the second tab section on the outer edge of the respective side part so that between the opposite outer edges a thickness reduced under certain conditions of merely 1.2 mm is sufficient in order to be able to absorb the pressures that occur during the operation of the heat exchanger. The aim here is in particular a reduction of the overall thickness of the respective side part that is so great that the weight increase occurring through the respective second tab sections can be compensated for. In this case, the side part according to the invention could thus be produced weight-neutrally.

Practically, the frame part is designed as a closed rectangular frame having two longitudinal sides and two transverse sides, wherein each longitudinal side is connected to an associated outer edge of a side part, i.e. the first tab section of the same, and each transverse side to an associated outer edge of a bottom part and of a box part. Both the respective outer edge of the side part and also, orthogonally thereto, a respective outer edge of the bottom part and of the box part are arranged here in corresponding first receptacles of the frame part, in particular pressed in and soldered. Here, the outer edge of the frame part is likewise formed S-shaped and comprises a second receptacle that is open opposite to the first receptacle, in which for example an outer edge of a diffuser can be received. By way of the first and second receptacle, the heat exchanger can be comparatively easily pre-fabricated and also pre-fixed for a soldering process subsequent to this.

Furthermore, the present invention is based on the general idea of stating a side part of a heat exchanger described above, which on one side is solder-plated and wherein at least one outer edge of the side part has an S-shaped bent-over tab as edge reinforcement with a first tab section solder-plated on the outside and a second tab section solder-plated on the inside. Such a side part cannot only be produced cost-effectively and preferentially even weight-neutrally, but it also facilitates the soldering to a heat exchanger substantially, since the second tab section offers a working surface that is not solder-plated on the outside for a pressure tool, for example a soldering frame.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF DRAWINGS

There it shows, in each case schematically.

DETAILED DESCRIPTION

Figure 1:
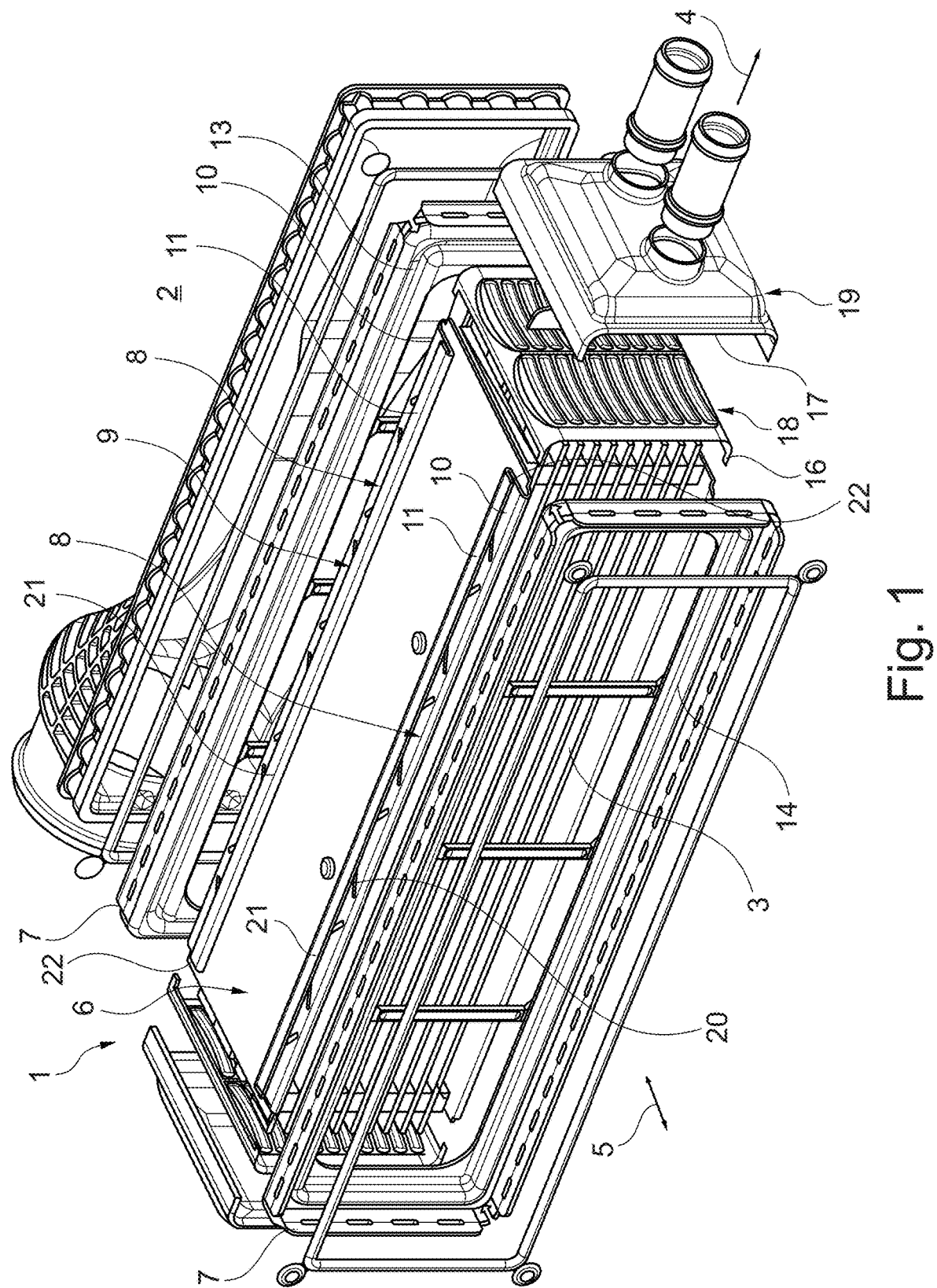
FIG. 1 an exploded representation of a heat exchanger according to the invention, FIG. 2 a lateral view of the heat exchanger, FIG. 3 a sectional representation along the section plane A-A from FIG. 2, FIG. 4 a lateral view of a side part according to the invention, FIG. 5 a detail representation Z from FIG. 4, FIG. 6 a front view of the side part according to the invention, FIG. 7 a detail representation C from FIG. 7.
Figure 2:
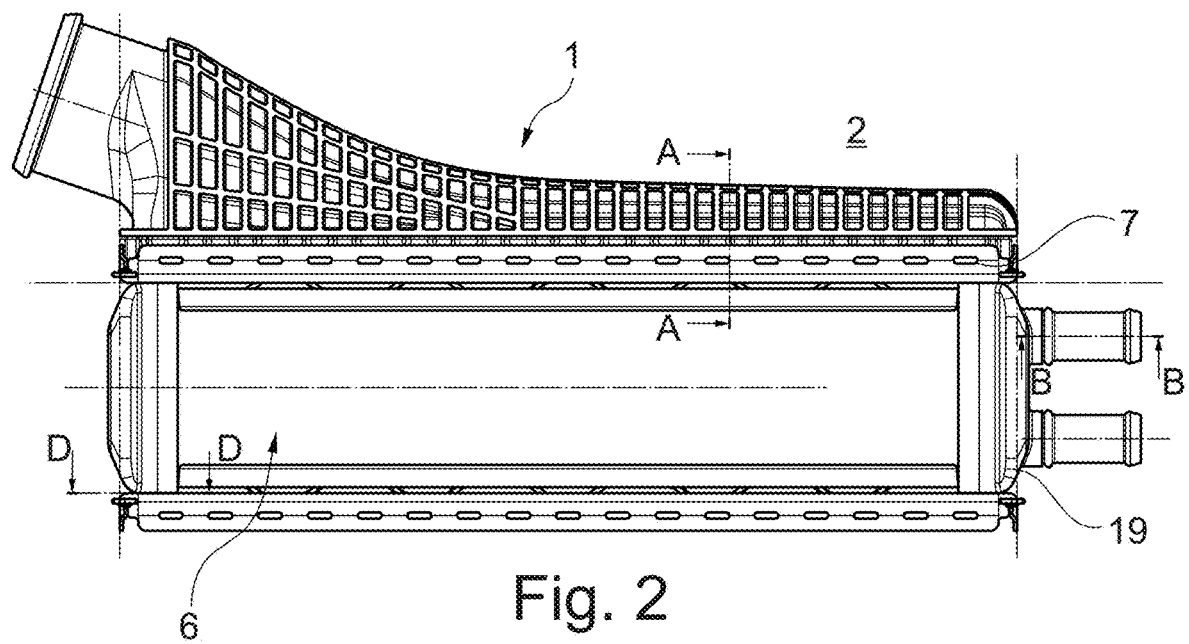
Figure 3:
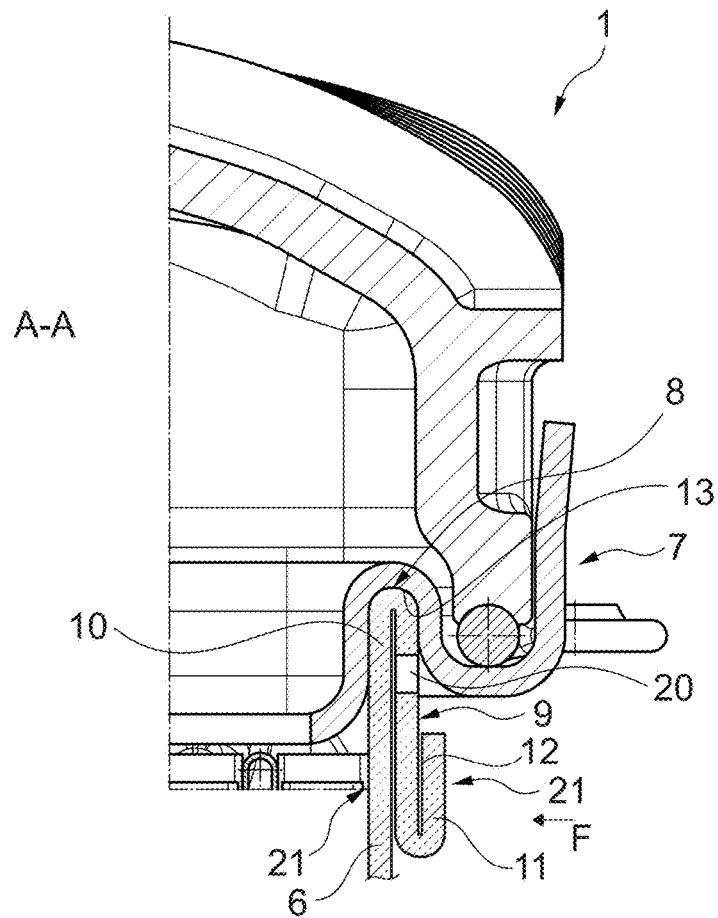

According to FIGS. 1 to 3, a heat exchanger 1 according to the invention, which can be designed for example as indirect charge air cooler of an internal combustion engine 2, comprises a first channel system with tubes 3 for a first fluid flowing in a first flow direction 4, wherein between the tubes 3 a second channel system that is fluidically separated from the first channel system for a second fluid is formed, which can be flowed through in a second flow direction 5. The second channel system is fluidically bounded by way of two opposing side parts 6 (see also FIGS. 4 to 7). In addition to this, the heat exchanger 1 comprises at least one frame part 7 which is soldered and in particular pressed together with a respective outer edge 8 of the side parts 6 on the longitudinal side. Looking at the outer edges 8 of the side parts 12 in more detail, it is noticeable that the same comprises an S-shaped bent-over tab 9 with a first tab section 10 solder-plated on the outside and a second tab section 11 solder-plated on the inside. Here, the solder plating is marked with the reference number 12. The frame part 7 in turn has an S-shaped cross section with a first receptacle 13, in which the outer edge 8 of at least one side part 6 with its first tab section 10 is received, as is clearly noticeable according to FIG. 3.

Here, the side parts 6 can be formed as aluminium plates solder-plated on one side and subsequently suitably transformed. Here, the first tab section 10 has a width B1, whereas the second tab section 11 has a width B2. The two widths B1 and B2 can have the following ratio: $B2 \geq (B1)/2$. The width B1 can for example amount to 15 mm. A thickness D of the side part 6 amounts to approximately 1.2 mm±0.1 mm, so that the side part 6 in the region of the first tab section 10 is approximately 2.4 mm±0.1 mm thick, while in the second tab section 11 it is approximately 3.6 mm thick.

Figure 6:
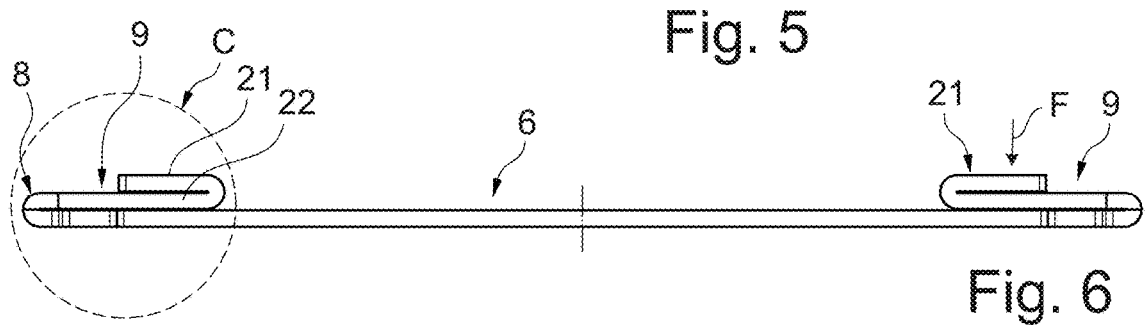
Figure 7:
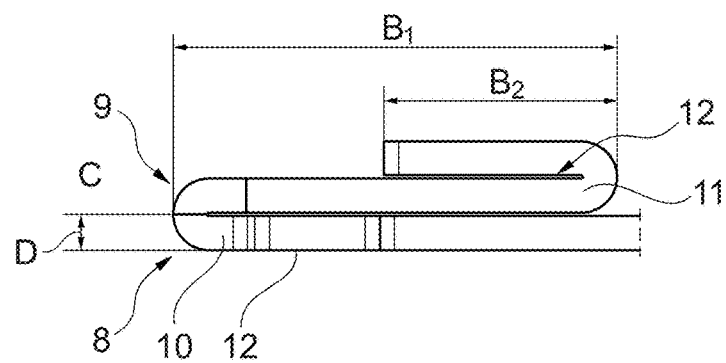

As is noticeable in particular in FIGS. 1, 3 and 6, a pressure force F can be exerted via the respective second tab section 11 on the side part 6 from the outside and because of this a pre-fixing of the heat exchanger 1 during the soldering achieved, without it having to be feared that a soldering frame used for the pressing-on is soldered to the side part 6 and because of this has to be subsequently removed again from the same in an elaborate, manual and expensive manner. Specifically in the second tab section 11 the solder plating 12 is located inside while first tab section 10 it is located outside and because of this brings about the soldering in the receptacle 13 of the frame part 7.

In addition to this, the frame part 7 can be connected via a solder connection to the first tab section 10 of the respective side part 6. Looking at FIG. 1 further it is noticeable that the frame part 7 is designed as a closed rectangular frame with two longitudinal sides 14 and two transverse sides 15, wherein each longitudinal side 14 is connected to an associated outer edge 8 of an associated side part 6 and each transverse side 15 to an associated outer edge 16 of a bottom part 18 and an outer edge 17 of a box part 19. The bottom 18 and the box part 19 each form a collector for a fluid flowing in the tubes 3.

Figure 4:
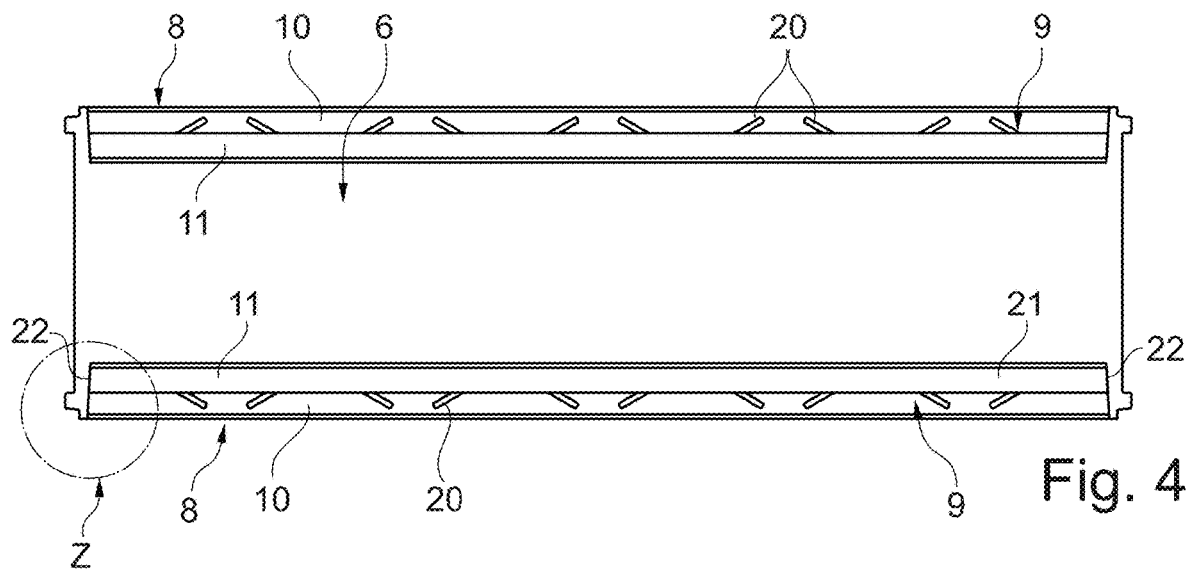

Looking at FIGS. 1 and 4 further it is noticeable that the side part 6 has perforations 20 in the region of the first tab section 10, wherein these perforations can be formed as openings and/or as recesses, in particular impressions and contribute to better distributing the solder during the soldering. By way of this, an even, reliable and tight soldering can be achieved in particular.

Besides the entire heat exchanger 1, the side part 6 for such a heat exchanger 1 is obviously also subject of the invention such a side part 6 is cost-effectively producible as shaped sheet metal part, in particular of aluminium and additionally has the major advantage that in the region of its second tab section 11 it provides a working surface 21 for applying a pressure force F, wherein the working surface 21 does not have any solder plating 12 and because of this no soldering whatsoever for example to a soldering frame has to be feared. Through the second tab section 11 provided for the first time according to the invention, the stiffness of the side part 6 can be additionally increased in the region of the outer edge 8, as a result of which in particular the risk of an uncontrolled tearing can also be minimised.

Figure 5:
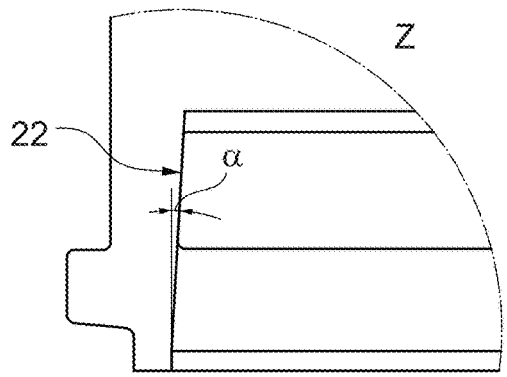

Looking at FIG. 5 it is noticeable therein that a face-end edge 22 of the outer edge 8 is slanted by an angle α of approximately 3° which facilitates the assembly and thus the manufacture of the heat exchanger according to the invention.

Generally, the manufacture and production of the heat exchanger 1 can be simplified with the side part 6 according to the invention and with the heat exchanger according to the invention constructed from these, since through the second tab section 11 provided for the first time according to the invention, a working surface 21 that is not solder-plated is available for the first time, via which a pressure force F for fixing during the soldering can be applied.

The invention claimed is:

1. A heat exchanger for an internal combustion engine, comprising:
    a plurality of tubes that provide a first channel system for a first fluid,
    a second channel system for a second fluid disposed between the plurality of tubes that is fluidically separated from the first channel system,
    two opposite side parts for fluidically bounding the second channel system, between which the plurality of tubes are arranged,
    at least one frame part that is soldered together with a respective outer edge of the two side parts,
    the outer edge of at least one side part includes a tab bent over S-shaped as edge reinforcement with a first tab section solder-plated on an outside and a second tab section solder-plated on an inside,
    the at least one frame part has an S-shaped cross section with a first receptacle, and the first tab section of the outer edge of the at least one side part is received in the first receptacle, and
    wherein the first receptacle has a U-shaped profile in a cross-sectional view, and wherein the first tab section has a bent portion that is U-shaped in a cross-sectional view received in the U-shaped profile of the first receptacle.

2. The heat exchanger according to claim 1, wherein at least one of:
    the first tab section has a width B1 and the second tab section a width B2, wherein B1≥B2; and
    the first tab section has a width B1 that amounts to approximately 15 mm.

3. The heat exchanger according to claim 1, wherein at least one of:
    a thickness D of the at least one side part amounts to approximately 1.2 mm±0.1 mm, and
    a face-end edge is slanted by an angle of approximately 3°.

4. The heat exchanger according to claim 1, wherein the at least one frame part is connected via a solder connection to the first tab section of the at least one side part.

5. The heat exchanger according to claim 1, wherein the at least one frame part is structured as a closed rectangular frame with two longitudinal sides and two transverse sides, wherein each of the two longitudinal sides is connected to the outer edge of a respective one of the two side parts and each of the two transverse sides is connected to an associated outer edge of a bottom part and of a box part.

6. The heat exchanger according to claim 1, wherein the at least one side part has at least one of perforations and recesses in the first tab section.

7. The heat exchanger according to claim 1, wherein the first tab section includes a solder plating on the outside and the second tab section includes a solder plating on the inside.

8. The heat exchanger according to claim 1, wherein no solder plating is provided on an outside of the second tab section.

9. The heat exchanger according to claim 1, wherein the second tab section is bent over and overlays the first tab section.

10. The heat exchanger according to claim 1, wherein the bent portion is defined by a U-shaped transition of the first tab section to the second tab section.

11. A side part of a heat exchanger, comprising:
    at least one outer edge including a tab bent over S-shaped as edge reinforcement with a first tab section solder-plated on an outside and a second tab section solder-plated on an inside; and
    wherein the second tab section is bent over and overlays the first tab section, and wherein a transition from the first tab section to the second tab section defines a U-shape in a cross-sectional view.

12. The side part according to claim 11, wherein the first tab section has a width B1 and the second tab section a width B2, wherein B1≥B2.

13. The side part according to claim 11, wherein the first tab section includes a solder plating on the outside and the second tab section includes a solder plating on the inside, and wherein no solder plating is provided on an outside of the second tab section.

14. The side part according to claim 11, wherein at least one of:
    a thickness D of the side part amounts to approximately 1.2 mm±0.1 mm, and
    a face-end edge is slanted by an angle of approximately 3°.

15. The side part according to claim 11, further comprising at least one of perforations and recesses disposed in the first tab section.

16. An internal combustion engine, comprising: a heat exchanger configured as charge air cooler, the heat exchanger including:
    a plurality of tubes that provide a first channel system for a first fluid;
    a second channel system for a second fluid disposed between the plurality of tubes that is fluidically separated from the first channel system;

two opposite side parts for fluidically bounding the second channel system, between which the plurality of tubes are arranged;

at least one frame part that is soldered together with a respective outer edge of the two side parts;

the outer edge of at least one side part includes a tab bent over S-shaped as edge reinforcement with a first tab section solder-plated on an outside and a second tab section solder-plated on an inside; and the at least one frame part has an S-shaped cross section with a U-shaped first receptacle in a cross-sectional view, and wherein a bent portion of the first tab section of the outer edge of the at least one side part is received in the U-shaped first receptacle.

17. The internal combustion engine according to claim 16, wherein the second tab section is bent over and overlays the first tab section, and wherein the first tab section has a width B1 and the second tab section a width B2, wherein B1≥B2.

18. The internal combustion engine according to claim 16, wherein the first tab section includes a solder plating on the outside and the second tab section includes a solder plating on the inside, and wherein no solder plating is provided on an outside of the second tab section.

19. The internal combustion engine according to claim 16, wherein the at least one side part has at least one of perforations and recesses disposed in the first tab section.

\* \* \* \* \*